United States Patent
Erpelding

(10) Patent No.: US 7,349,184 B2
(45) Date of Patent: Mar. 25, 2008

(54) SYSTEM AND APPARATUS FOR CONTINUOUS REFERENCE PLANE FOR WIRELESS SUSPENSION

(75) Inventor: A. David Erpelding, San Jose, CA (US)

(73) Assignee: Hitachi Global Storage Technologies, Amsterdam (NL)

( * ) Notice: Subject to any disclaimer, the term of this patent is extended or adjusted under 35 U.S.C. 154(b) by 361 days.

(21) Appl. No.: 10/930,271

(22) Filed: Aug. 31, 2004

(65) Prior Publication Data

US 2006/0044695 A1    Mar. 2, 2006

(51) Int. Cl.
*G11B 5/60* (2006.01)

(52) U.S. Cl. .................. 360/245.8; 29/603.03

(58) Field of Classification Search .......... 360/245.9, 360/264.2, 245.8, 246; 29/603.03, 306.04, 29/603.05, 603.06, 831
See application file for complete search history.

(56) References Cited

U.S. PATENT DOCUMENTS

| | | | | |
|---|---|---|---|---|
| 5,608,591 A | * | 3/1997 | Klaassen | 360/245.9 |
| 5,694,270 A | | 12/1997 | Sone et al. | |
| 5,754,369 A | | 5/1998 | Balakrishnan | |
| 5,862,010 A | | 1/1999 | Simmons et al. | |
| 5,870,258 A | * | 2/1999 | Khan et al. | 360/245.9 |
| 5,982,584 A | | 11/1999 | Bennin et al. | |
| 5,995,328 A | | 11/1999 | Balakrishnan | |
| 6,002,548 A | * | 12/1999 | Ohwe et al. | 360/245.6 |
| 6,125,015 A | | 9/2000 | Carlson et al. | |
| 6,151,196 A | * | 11/2000 | Carlson et al. | 360/245.9 |
| 6,239,947 B1 | * | 5/2001 | Fan et al. | 360/245.9 |
| 6,249,404 B1 | | 6/2001 | Doundakov et al. | |
| 6,351,348 B1 | | 2/2002 | Erpelding et al. | |
| 6,381,100 B1 | * | 4/2002 | Bennin et al. | 360/245.9 |
| 6,466,413 B1 | | 10/2002 | Taksugi | |
| 6,587,310 B1 | | 7/2003 | Bennin et al. | |
| 6,700,748 B1 | | 3/2004 | Cowles et al. | |
| 6,741,426 B2 | * | 5/2004 | Girard | 360/245.4 |
| 6,757,137 B1 | * | 6/2004 | Mei | 360/245.7 |
| 6,762,913 B1 | * | 7/2004 | Even et al. | 360/246 |
| 6,956,722 B2 | * | 10/2005 | Wada et al. | 360/245.8 |
| 6,993,824 B2 | * | 2/2006 | Childers et al. | 29/603.03 |
| 2002/0041469 A1 | * | 4/2002 | Shiraishi et al. | 360/245.9 |
| 2003/0206376 A1 | | 11/2003 | Erpelding et al. | |

FOREIGN PATENT DOCUMENTS

| | | |
|---|---|---|
| JP | 53030310 | 3/1978 |
| JP | 2001143423 | 5/2001 |
| JP | 2003272119 | 9/2003 |

* cited by examiner

*Primary Examiner*—Brian E Miller
*Assistant Examiner*—Matthew G. Kayrish
(74) *Attorney, Agent, or Firm*—Bracewell & Giuliani LLP

(57) ABSTRACT

A reference plane is added to the freestanding conductors of a wireless suspension to maintain a continuous reference plane therein. Post processing steps to the flexure are used after the underlying steel has been etched and prior to any forming or welding steps. Two screens are used to add an insulator layer and a conductor layer, such as copper, in the areas of the freestanding conductors. The insulator screen is sized to allow an insulator to overlap the original polyimide. The copper screen for the reference has a slightly longer screen pattern than the insulator screen. The conductor screen is sized such that the reference will overlap the insulator and make contact with the underlying steel at both ends of the freestanding conductors.

21 Claims, 16 Drawing Sheets

SYSTEM AND APPARATUS FOR CONTINUOUS REFERENCE PLANE FOR WIRELESS SUSPENSION

BACKGROUND OF THE INVENTION

1. Technical Field

The present invention relates in general to an improved suspension for disk drives and, in particular, to an improved system, method, and apparatus for providing a continuous reference plane in wireless suspensions.

2. Description of the Related Art

Data access and storage systems comprise one or more storage devices that store data on storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm). Hard disk drives have several different typical standard sizes or formats, including server, desktop, mobile and micro-drive.

A typical HDD also utilizes an actuator assembly. The actuator moves magnetic read/write heads to the desired location on the rotating disk so as to write information to or read data from that location having an air bearing surface (ABS) that enables the slider to fly at a constant height close to the disk during operation of the disk drive, by a cushion of air generated by the rotating disk. Within most HDDs, the magnetic read/write head transducer is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk. Each slider is attached to the free end of a suspension that in turn is cantilevered from the rigid arm of an actuator. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

The motor used to rotate the disk is typically a brushless DC motor. The disk is mounted and clamped to a hub of the motor. The hub provides a disk mounting surface and a means to attach an additional part or parts to clamp the disk to the hub. In most typical motor configurations of HDDs, the rotating part of the motor (the rotor) is attached to or is an integral part of the hub. The rotor includes a ring-shaped magnet with alternating north/south poles arranged radially and a ferrous metal backing. The magnet interacts with the motor's stator by means of magnetic forces. Magnetic fields and resulting magnetic forces are induced via the electric current in the coiled wire of the motor stator. The ferrous metal backing of the rotor acts as a magnetic return path.

The suspension of a conventional disk drive typically includes a relatively stiff load beam with a mount plate at the base end, which subsequently attaches to the actuator arm, and whose free end mounts a flexure that carries the slider and its read/write head transducer. Disposed between the mount plate and the functional end of the load beam is a 'hinge' that is compliant in the vertical bending direction (normal to the disk surface). The hinge enables the load beam to suspend and load the slider and the read/write head toward the spinning disk surface. It is then the job of the flexure to provide gimbaled support for the slider so that the read/write head can pitch and roll in order to adjust its orientation for unavoidable disk surface run out or flatness variations.

The flexure in a wireless suspension is generally made out of a laminated multilayer material. Typically, it consists of a conductor layer (like copper), a di-electric layer (like polyimide), and a support layer (like stainless steel). The electrical lead lines are etched into the conductor layer, while the polyimide layer serves as the insulator from the underlying steel support layer. The steel support layer is also patterned to provide strength and gimbaling characteristics to the flexure. The conducting leads, called traces, which electrically connect the head transducer to the read/write electronics, are often routed on both sides of the suspension, especially in the gimbal region. Normally the traces consist of copper conductor with polyimide dielectric layer but no support stainless steel layer and only provide the electrical function. The mechanical function is provided by the flexure legs (stainless steel only) which normally run adjacent to the traces.

In disk drives, the rate of data transfer is increasing as users demand faster access to their data. Several factors influence the transfer rate: the magnetic transducer, the transmission line between the magnetic transducer and the arm electronics (A/E), and the A/E itself. The present invention generally addresses improving the transmission line and, in particular, the wireless suspension. Perturbations in the transmission line on wireless suspensions cause reflection points for the data signal as well as increase impedance in the transmission line. A few causes for perturbations are: sharp bends in the conductors, rapid changes in their cross section, and disruptions in the reference plane under the conductors. The present invention is particularly focused on eliminating disruptions in the reference plane under the conductors. The reference plane in wireless suspensions, such as an Integrated Lead Suspension (ILS) and a Circuit Integrated Suspension (CIS), is the steel that is used to fabricate the suspension's flexure.

Disruptions in reference plane are a by-product of fabricating the flexure to its desired shape and function. Referring to FIGS. 14-17, the write driver, which is part of the A/E, is connected to the flexure steel to provide a reference plane to ground. This is a constant electrical return path for the transmission lines and write driver and does not electrically short the conductors. It is desirable to reduce the total impedance ($Z_o$) of the transmission lines in order to achieve higher data rate. $Z_o$ is related to the total capacitance and inductance of the transmission lines through the relationship of:

$$Z_o = \sqrt{[L/C]}$$

where L is the inductance and C is the capacitance of the transmission lines. By minimizing the discontinuities in the reference plane, L is decreased and C is increased.

In the prior art, some designs such as U.S. Pat. Nos. 5,862,010 and 5,986,853, address the problem described above by adding a second layer of copper in the ILS laminate. One drawback to this approach includes the cost of fabrication, both in the laminate and in the ILS etching process. Producing ILS designs with the desired flexure stiffness also becomes a challenge with an extra layer of copper. Thus, an improved continuous reference plane for wireless suspensions would be desirable.

Referring again to FIGS. 14-17, the write driver in a signal generating system of an HDD generally produces a differential mode (DM) write signal. But there can be also a considerable common mode (CM) signal component. If this CM component is not transmitted, the write driver does not work properly. There is always present an impedance asymmetry in the signal generating system due primarily to the ILS and the write driver. This asymmetry can cause the CM signal component to be reflected and converted into a DM signal. The transmission line model for CM (FIGS. 14 and 15) illustrates that the electrical potential of the two signal lines is in phase; both lines have the same potential. Observation of the electric field illustrates that the signal return path for each conductor is through the reference plane along the full length of the reference plane adjacent to the conductor. The impedance of the system is greatly dependent on the continuity of the reference plane.

The transmission line model for DM (FIGS. 16 and 17) illustrates that the electrical potential of the two signal lines is out of phase. Observations of the electrical field illustrate that the return path for the electric current in the reference plane underneath the signal conductors is local and transverse (perpendicular to the conductors) through the reference plane between conductors. Disruptions or discontinuities in the reference plane for a DM signal affect the impedance of the transmission line to a lesser degree than similar discontinuities in the reference plane for a CM signal. The effect on impedance of a discontinuity for a DM signal is proportional to the length of the discontinuity in the reference plane to the total length of the reference plane adjacent to the conductor. Where as a discontinuity in the reference plane for a CM signal creates a break and is totally disruptive to the signal return path and therefore has a very large effect on impedance. In a well-designed ILS or CIS all factors that affect the transmission lines' impedance are balanced for optimum performance of the signal generating system. This is especially important at high data rates.

SUMMARY OF THE INVENTION

One embodiment of a system, method, and apparatus of the present invention adds a reference plane to the existing conductors of a suspension where the underlying steel support layer has been removed from the conductors to maintain a continuous reference plane. The disclosed invention involves post processing steps to the ILS or CIS flexure after the steel layer has been etched and prior to any forming or welding steps.

The present invention is readily applicable to wireless suspensions and, in particular, to any and all areas of freestanding copper thereof. For example, the freestanding copper in the area of the gimbal is the focus of one embodiment of the invention. The invention is well suited to capitalize on the fabrication of the ILS/CIS in strip form. Twenty to twenty-five ILS/CIS are fabricated simultaneously in a strip. The invention utilizes a mechanical mask or screen for adding an insulator layer and a copper layer in the areas of freestanding copper. The process for forming a formed limiter on the ILS/CIS is also performed at the strip level. In the unformed state, the ILS/CIS have flat and planar surfaces. With the unformed ILS/CIS etched components still attached in a strip form, the individual components are accurately held with respect to each other. At this point in the ILS/CIS process, a mechanical mask or screen is aligned to the strip with, e.g., alignment holes.

Regarding the insulator and copper reference, the conductors in the gimbal region with the insulator and copper reference are typically formed with two screens that are used in the process of first applying the insulator and then applying the copper reference. The first screen for the insulator has a slightly shorter screen pattern than the screen for the copper reference. The insulator screen is sized such that it will allow an insulator to be applied in a manner that overlaps the original ILS/CIS polyimide. The polyimide in the gimbal region closest to the head is longer and easier to overlap. The polyimide at the opposite end is more closely aligned to the edge of the steel. Here the insulator can overlap the steel as well as the polyimide. The screen for the copper reference has a slightly longer screen pattern than the screen for the insulator. The conductor screen is sized such that the copper reference will overlap the insulator and make contact with the ILS/CIS steel at both ends of the freestanding copper.

Another embodiment of the present invention does not require the copper reference plane to be in contact with the ILS/CIS steel. One or both ends of the copper reference plane can be separated from the ILS/CIS steel by the thickness of the insulator. Electrical continuity is still achieved. Eddy currents are generated in the copper reference plane and ILS/CIS steel, which allows them to be electrically connected through capacitive coupling.

The insulator may be applied by one of several application techniques known in the industry. Vacuum processes, such as RF sputtering or evaporation, can apply several different insulators, such as alumina or a fluorocarbon film. Defining the geometry of the insulator can be achieved by photolithographic processes known in the industry. Another technique and material is a spray coating of polyimide through the screen pattern. This technique and material are used in the liquid crystal display (LCD) industry for applying a few hundred angstroms of polyimide. The thickness is typically about 1,000 to 1,500 angstroms of the sprayed-on polyimide. This thickness is determined by the roughness of the steel layer and the ability of the polyimide to cover the steel and/or copper completely. The polyimide adheres only where there is material, thus eliminating the need for fine resolution photolithographic processes such as those used in the fabrication of the ILS/CIS. Since the ILS/CIS are chemically etched, there is an associated wall angle to the sides of the etched features. The wall angle facilitates the making of a continuous insulator film.

The copper reference layer also may be applied through several different application techniques, such as RF sputtering, evaporation, or plating. Defining the geometry of the copper reference layer can be achieved by photolithographic processes known in the industry. One application method and configuration of the copper reference is to RF sputter approximately 200 angstroms of Cr as an adhesion layer on top of the insulator film and steel through a screen pattern. The copper reference is applied next through the same screen pattern to a thickness of about 1,000 to 1,500 angstroms. A protective coating of approximately 200 angstroms of Cr is then applied to protect against corrosion. This technique is not limited to the use of copper as the reference material. However, copper is desirable because of its high conductivity and low cost. Other materials with suitable conductivity also may be used.

As stated above, although this description of applying an insulator and copper reference focuses on the gimbal region, it is applicable to all areas of freestanding copper. The gimbal region is used to illustrate the present invention since it is one of the more sensitive areas for mechanical performance. The stiffness of the copper contributes about 30% to gimbal pitch stiffness and about 10% to roll stiffness. These values are based on 12-micron thick copper. The stiffness of a beam is a factor of the cube of its thickness. Therefore, 3,400 angstroms of additional material in the gimbal increases its pitch stiffness by a negligible amount, i.e., about:

$$[(0.34 \times 10^4)^3/(12 \times 10^4)^3] \times 100 \times 30\% = 6.8 \times 10^{-4}\%.$$

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
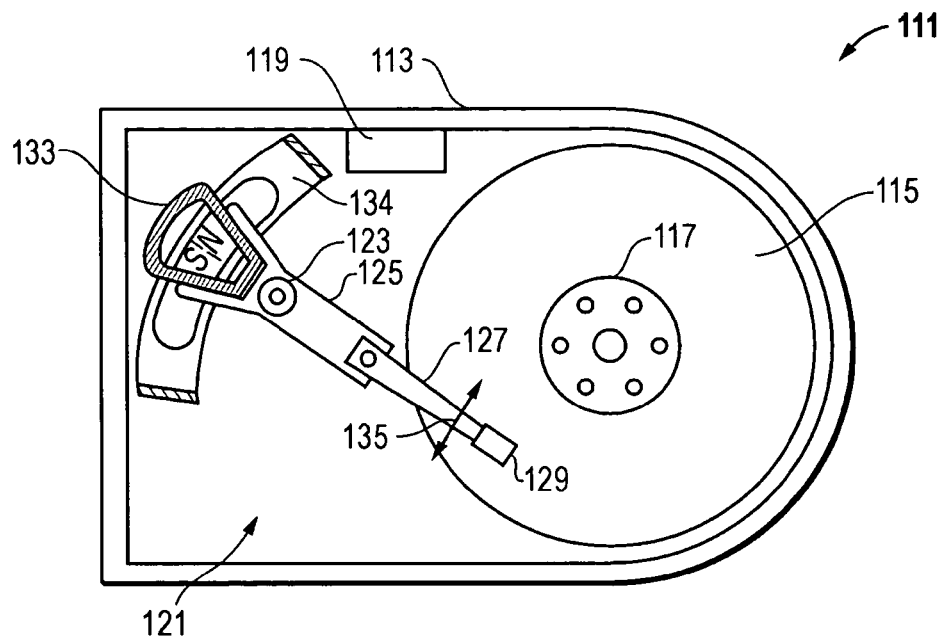
FIG. 1 is a plan view of a disk drive constructed in accordance with the present invention.

Referring to FIG. 1, a schematic drawing of one embodiment of an information storage system comprising a magnetic hard disk file or drive 111 for a computer system is shown. Drive 111 has an outer housing or base 113 containing at least one magnetic disk 115. Disk 115 is rotated by a spindle motor assembly having a central drive hub 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be femto size (approximately 850×700×230 microns) and is pre-loaded against the surface of disk 115 (in the range one to ten grams) by suspension 127.

Suspensions 127 have a spring-like quality which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Figure 2:
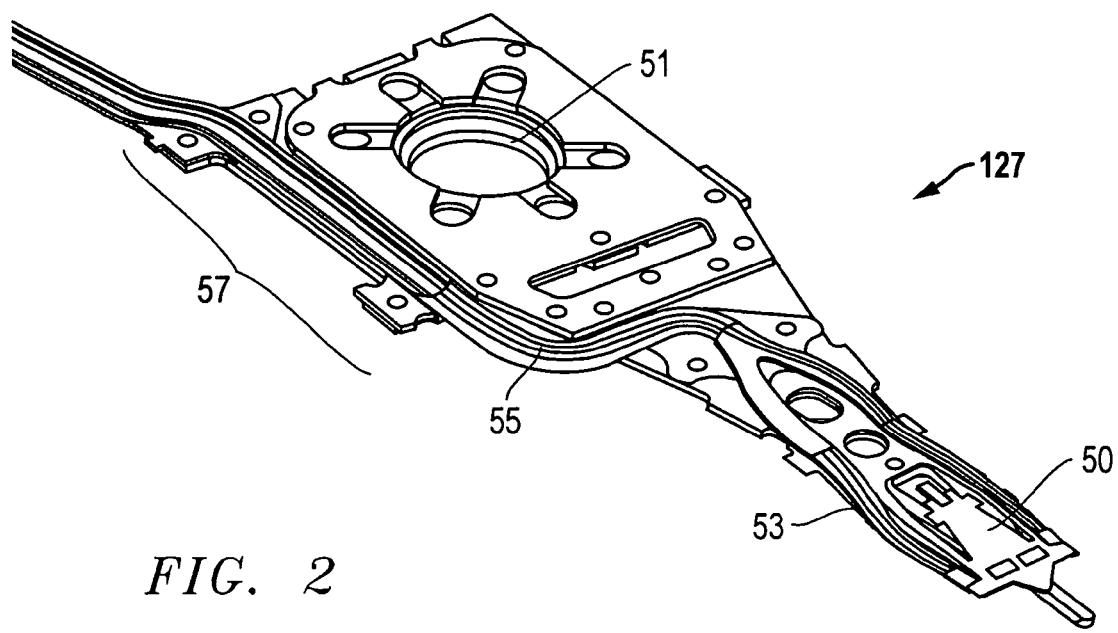
FIG. 2 is a top isometric view of a suspension of the disk drive of FIG. 1 and is constructed in accordance with the present invention.
Figure 3:
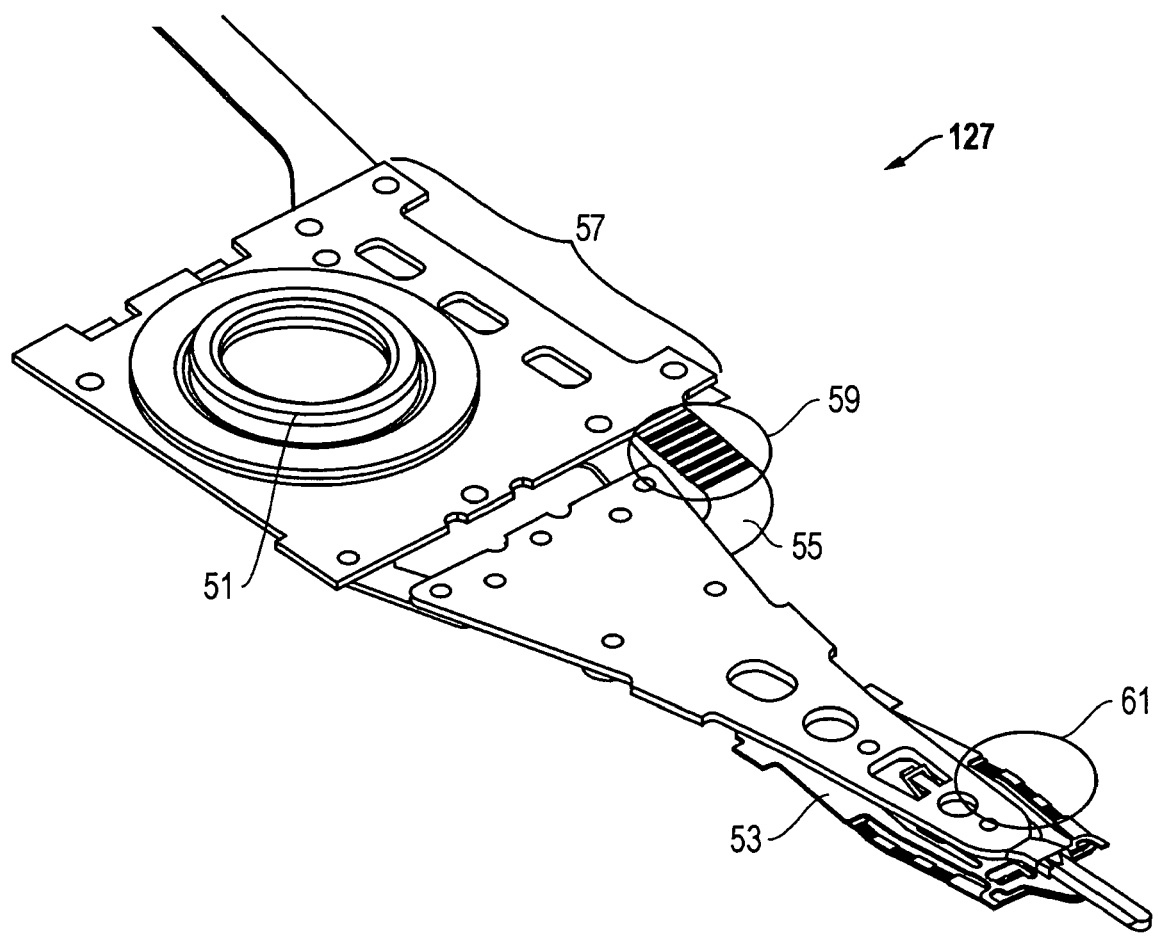
FIG. 3 is a bottom isometric view of the suspension of FIG. 2 and is constructed in accordance with the present invention.
Figure 4:
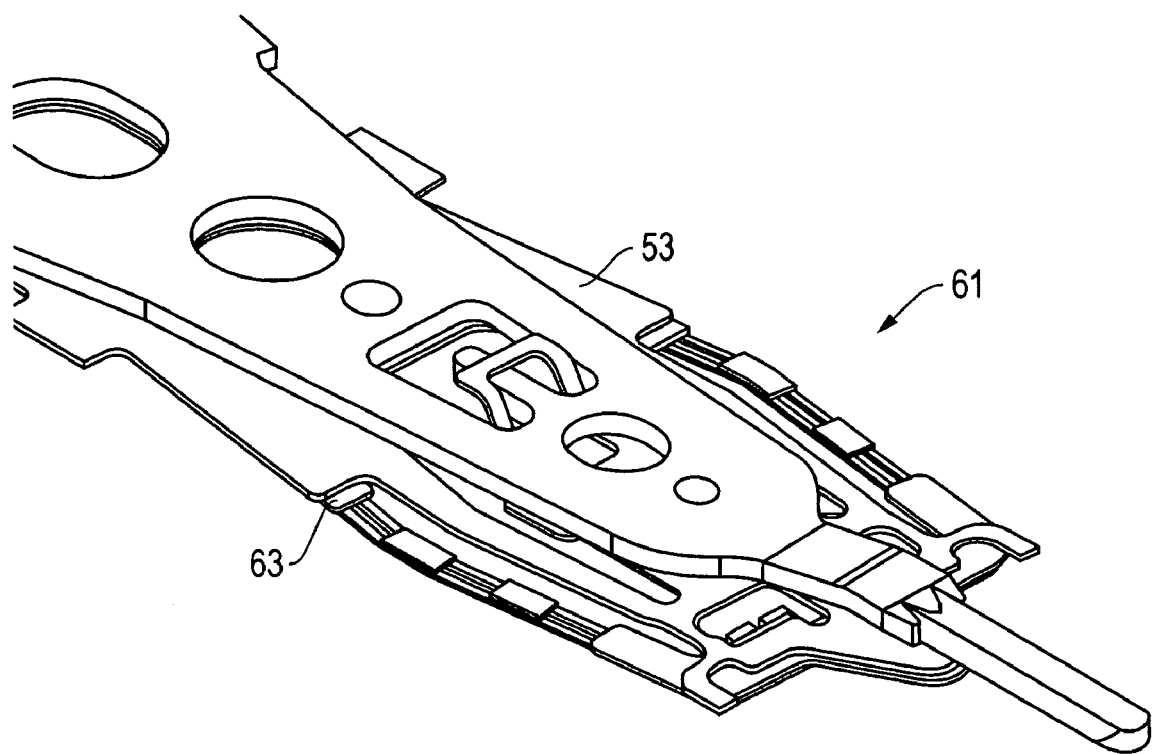
FIG. 4 is an enlarged isometric view of a gimbal area of the suspension of FIG. 3 and is constructed in accordance with the present invention.

Referring now to FIGS. 2-13, one embodiment of a system, method, and apparatus for improving the data rate capability of suspensions in disk drives is shown. For example, FIGS. 2 and 3 illustrate enlarged views of both sides of a completed wireless suspension 127 for the disk drive 111 of FIG. 1, but is shown without the slider or transducer for simplicity. The slider would normally be affixed at area 50. In the version shown, suspension 127 comprises a mount plate 51 and a flexure 53 that is mounted to the mount plate 51 for providing structural support and continuity of the reference plane to ground.

Figure 5:
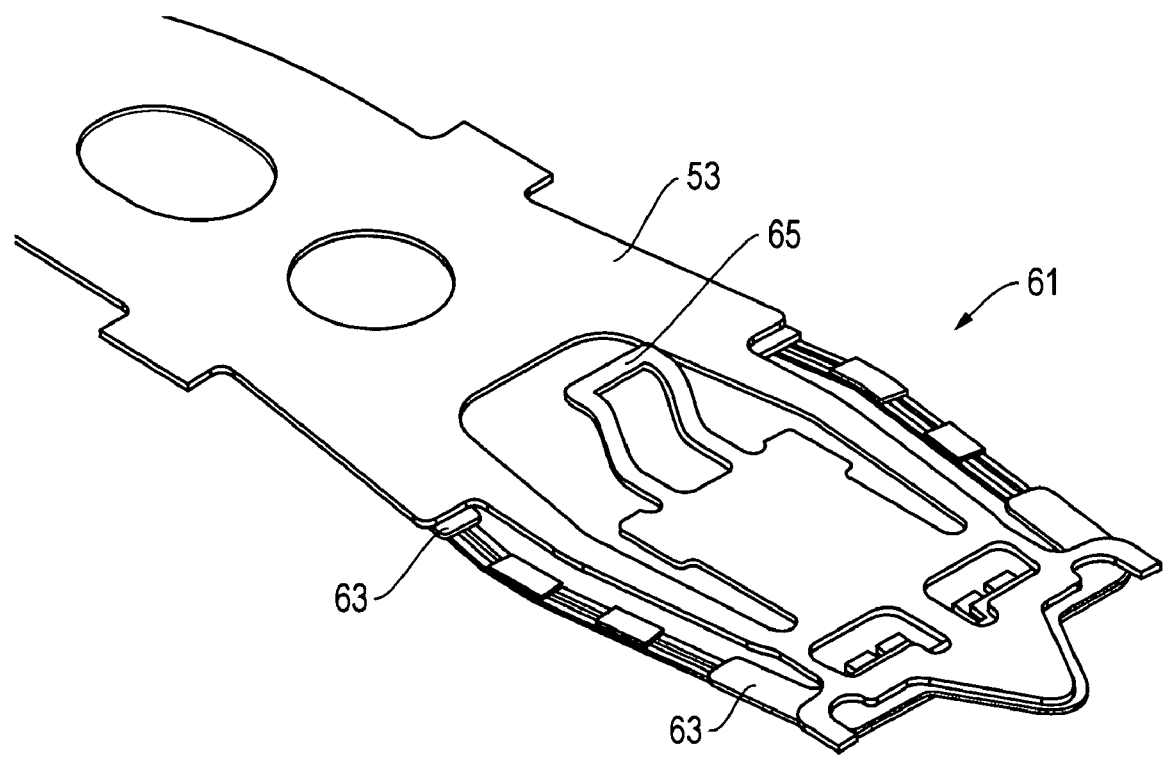
FIG. 5 is an isometric view of the gimbal area of FIG. 4 at a prior stage of assembly and is constructed in accordance with the present invention.
Figure 6:
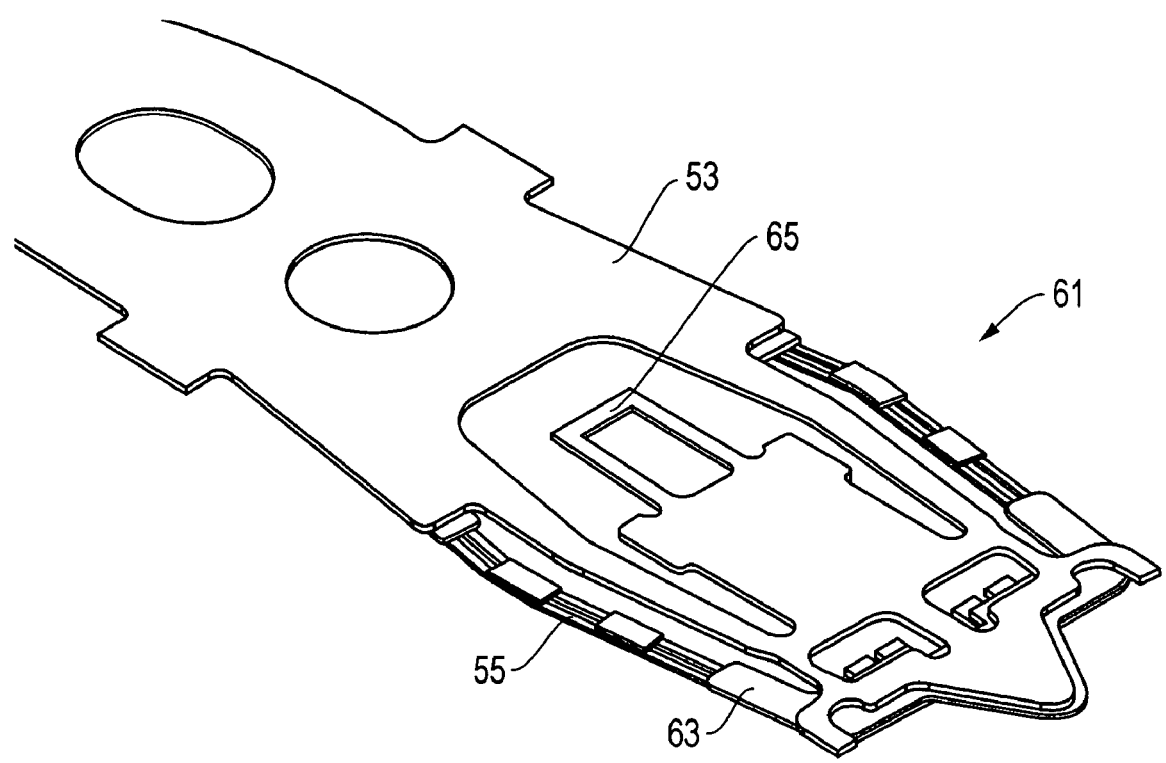
FIG. 6 is an isometric view of the gimbal area of FIG. 5 at a prior stage of assembly and is constructed in accordance with the present invention.

At least one conductor 55 (a plurality is shown) extends from an area 57 adjacent the mount plate 51 to the flexure 53. The conductor 55 is spaced apart from at least a portion of the flexure 53 to define, for example, freestanding portions 59, 61 (FIG. 3) of the conductor 55. For simplicity of discussion, this disclosure will describe the details of freestanding portion 61 in the gimbal area of suspension 127. However, one skilled in the art will immediately recognize that any other area of the suspension may be adapted as well. In addition, an insulator 63 (FIGS. 4-6) is located between the flexure 53 and the conductor 55 to insulate the conductor 55 from the flexure 53. FIG. 5 depicts the limiter 65 after it is formed, and FIG. 6 depicts the limiter 65 before it is formed.

Figure 7:
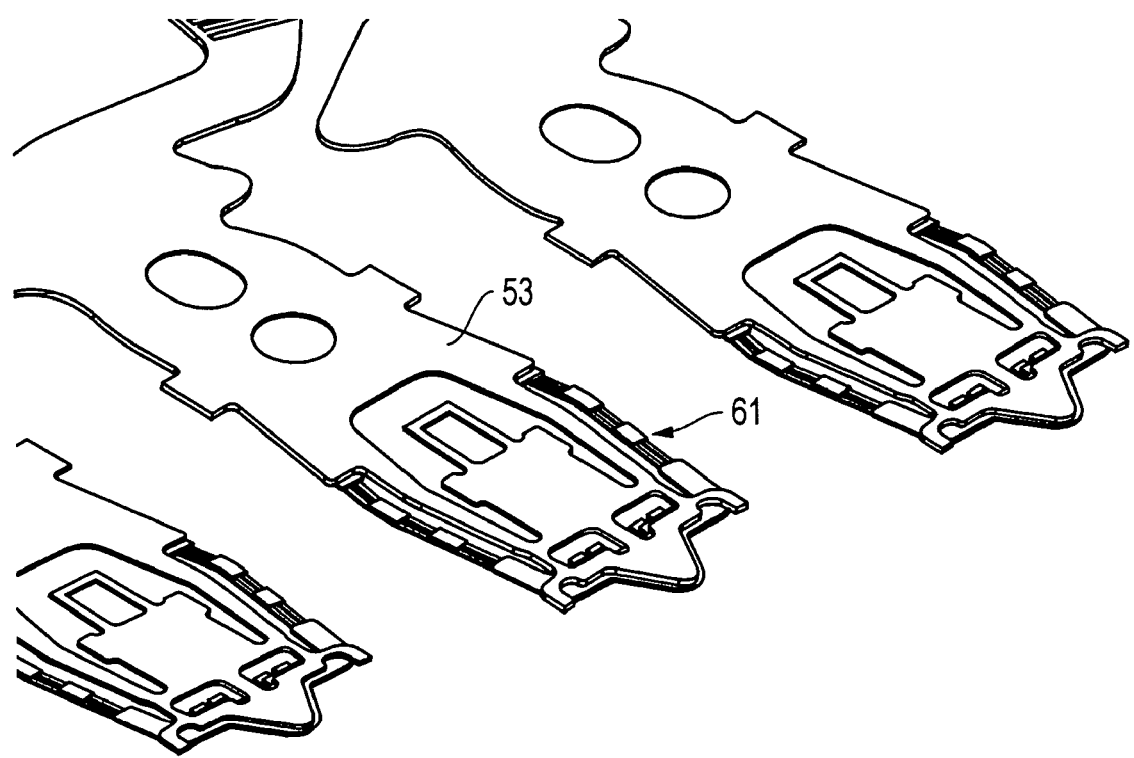
FIG. 7 is an isometric view of a plurality of the gimbal areas of FIG. 6 in a strip form and is constructed in accordance with the present invention.
Figure 8:
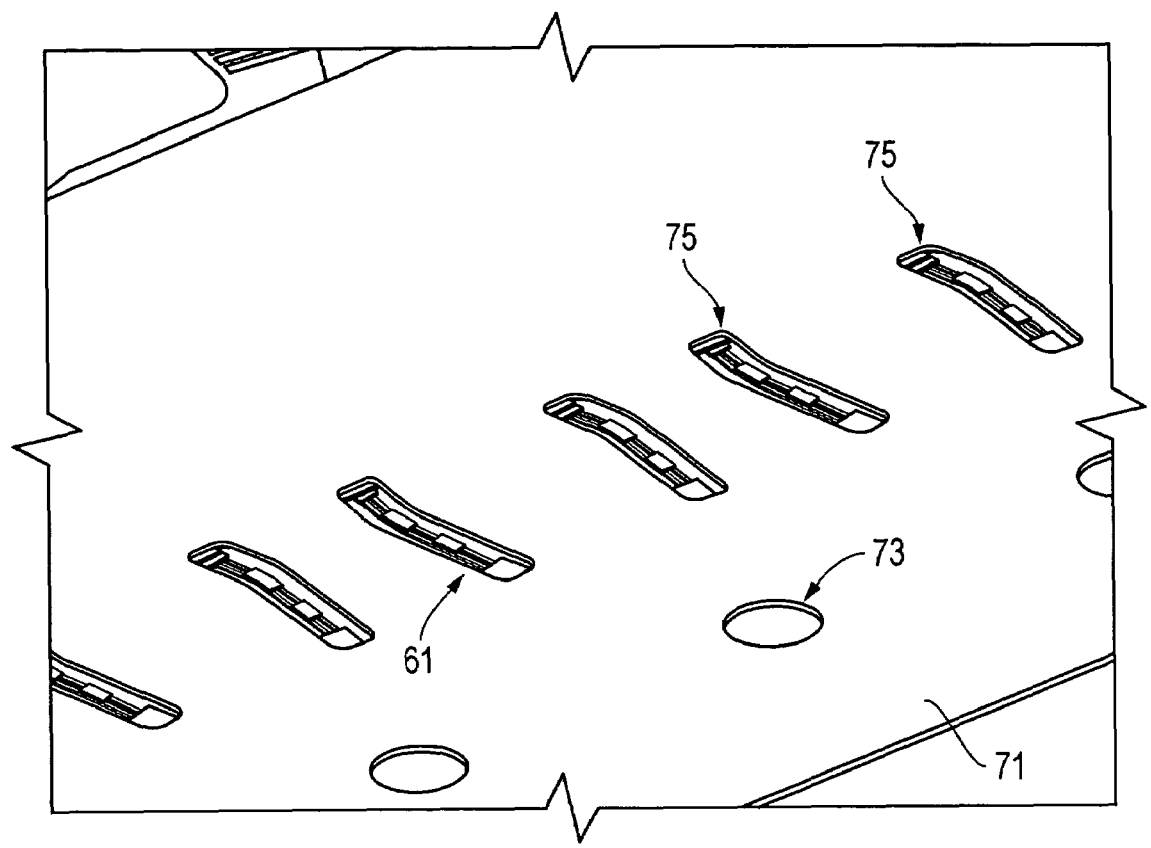
FIG. 8 is an isometric view of a screen and the plurality of gimbal areas of FIG. 7 and is constructed in accordance with the present invention.
Figure 9:
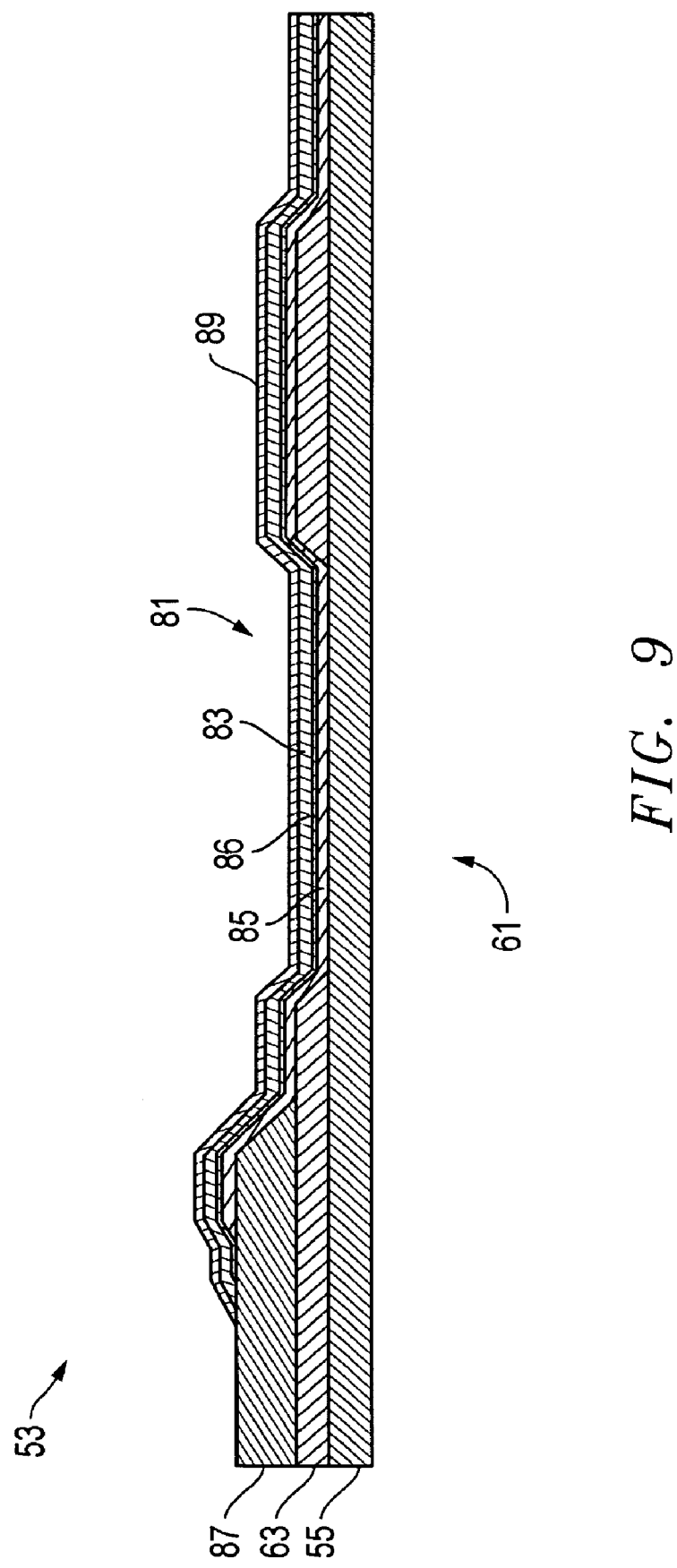
FIG. 9 is a sectional side view of a portion of a freestanding conductor area of the suspension of FIG. 10, taken along the lines 9-9, and is constructed in accordance with the present invention.

As shown in FIG. 7, the suspensions 127 are typically fabricated simultaneously in strip form of about 20 to 25 pieces that are joined together. Wireless suspensions such as integrated lead suspensions (ILS) or circuit integrated suspensions (CIS) are well suited for this type of application. A mechanical mask or screen 71 (FIG. 8) is aligned to the strip with alignment holes 73, for example. The screen 71 is provided with a screen pattern 75 that aligns with the freestanding portions 61.

Referring now to FIGS. 9-13, the present invention also comprises an auxiliary reference plane 81 formed on the freestanding portion 61 for improving transmission of the conductor 55 between, for example, the arm electronics of the actuator 121 (FIG. 1) and the magnetic transducer 129. One embodiment (FIGS. 9-10) of the auxiliary reference plane 81 (hatched in FIG. 10) has a conductive reference 83 for further referencing the conductor 55, and a second insulator 85 (FIG. 9) formed between at least some of the conductive reference 83 and at least some of the flexure 53 (e.g., the base or support layer 87) such that any disruptions in referencing the suspension 127 are significantly reduced or substantially eliminated. An enlarged view of the mask or screen 71 and its screen pattern 75 is used to produce auxiliary reference plane 81.

In one embodiment, the base layer 87 comprises steel, the insulator 63 comprises polyimide, the conductor 55 and conductive reference 83 comprise copper, and the second insulator 85 comprises alumina or a fluorocarbon film. Some of the base layer 87 of the flexure 53 may be removed to form a space between the freestanding portion 61 of the conductor 55 and at least a portion of the flexure 53.

In one version, the second insulator 85 may be provided a thickness of about 0.1 to 18 microns, and the conductive reference 83 may have a thickness of about 1,000 to 1,500 angstroms. For conductive reference 83 fabricated the same width as the copper conductors, the width of the copper conductors will scale with the thickness of the insulators. In another version, the width of the conductive reference 83 is made narrower than the copper conductors; the width of the conductive reference will scale with the thickness of the insulators. The thickness of the insulators will be limited by the ability to fabricate the conductors, or the conductive reference to a practical width, and to maintain the functionality of the gimbal. Moreover, the present invention may further comprise an adhesion layer 86 of Cr between the second insulator 85 and the conductive reference 83, and a protective coating 89 of Cr on the conductive reference 83 to protect the conductive reference 83 against corrosion.

Figure 10:
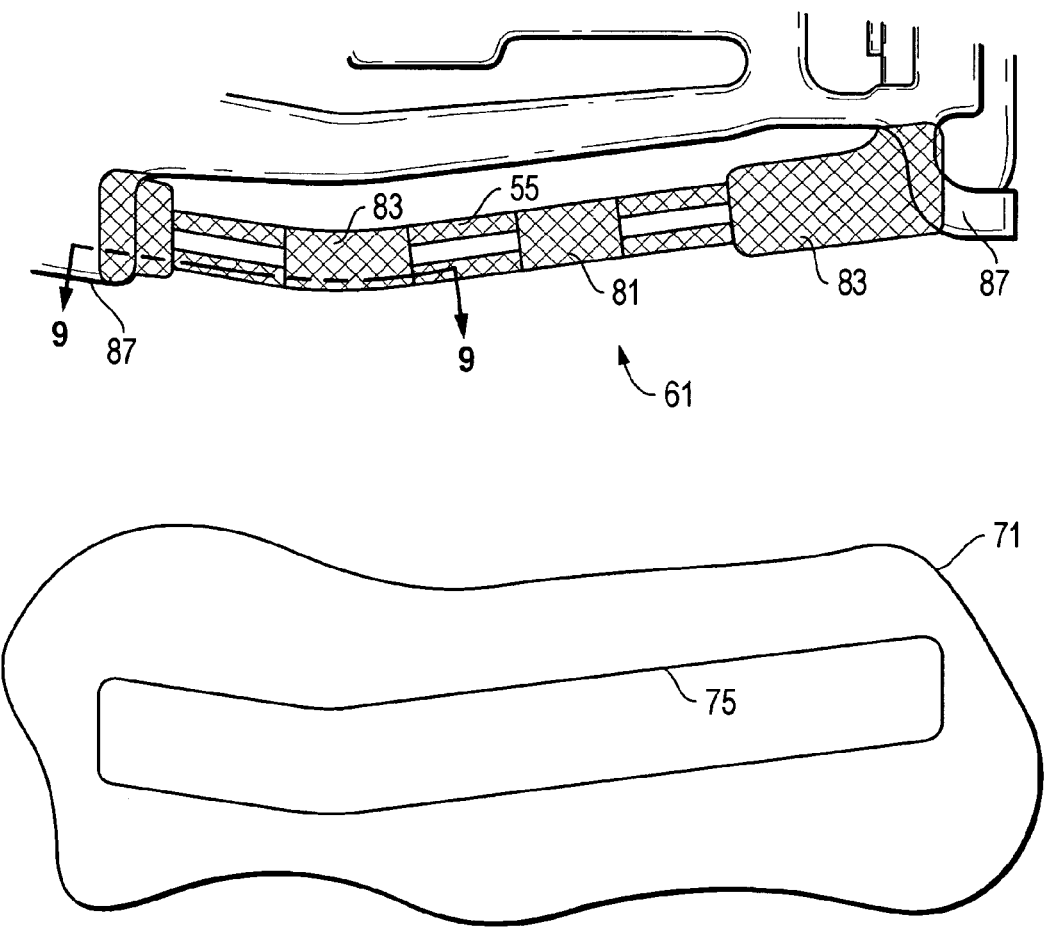
FIG. 10 is an enlarged top view of one embodiment of a freestanding portion having a complete conductive reference and a mask and is constructed in accordance with the present invention.
Figure 11:
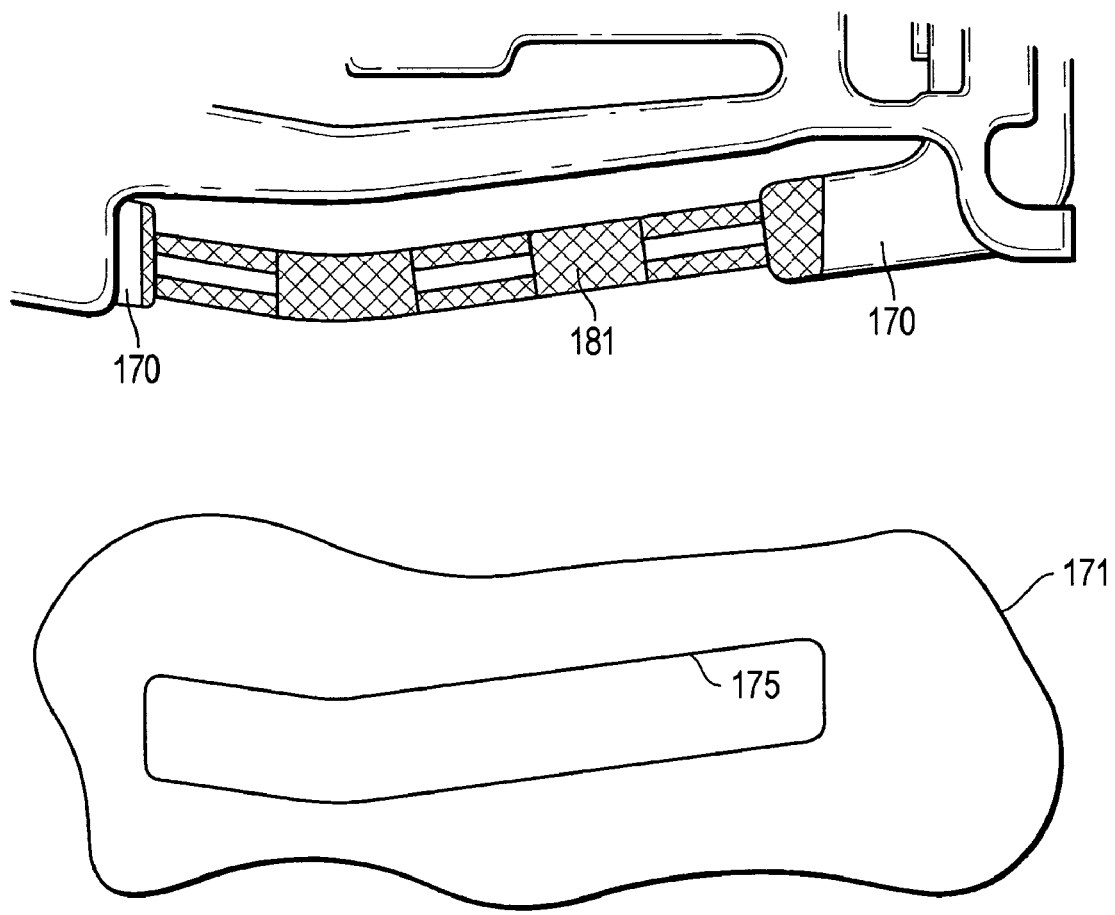
FIG. 11 is an enlarged top view of an alternate embodiment of a freestanding portion having a partial conductive reference and a mask used to produce the partial conductive reference and is constructed in accordance with the present invention.

In FIG. 10, the conductive reference 83 makes contact with the flexure 53 at both ends of the freestanding portion 61. However, in a different embodiment (FIG. 11), the second insulator can overlap at least some of the insulator and at least some of the flexure, such that the conductive reference does not make contact (see spaces 170) with the flexure at at least one end (both shown) of the freestanding portion. In this case, the screen pattern 175 in screen 171 is shorter than in the previous embodiment to produce a shorter reference plane 181.

Figure 12:
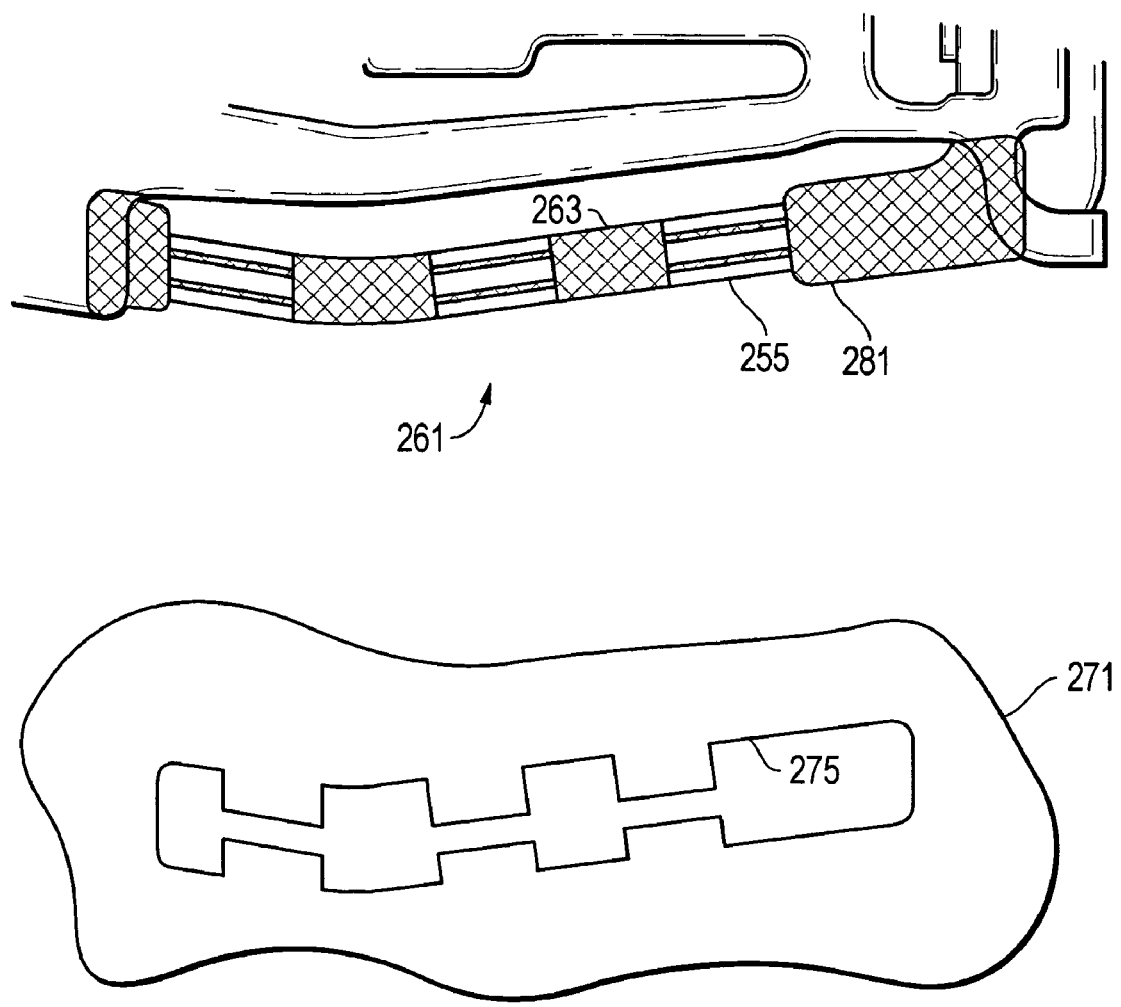
FIG. 12 is an enlarged top view of another alternate embodiment of a freestanding portion having a varying conductive reference and a mask used to produce it and is constructed in accordance with the present invention.
Figure 13:
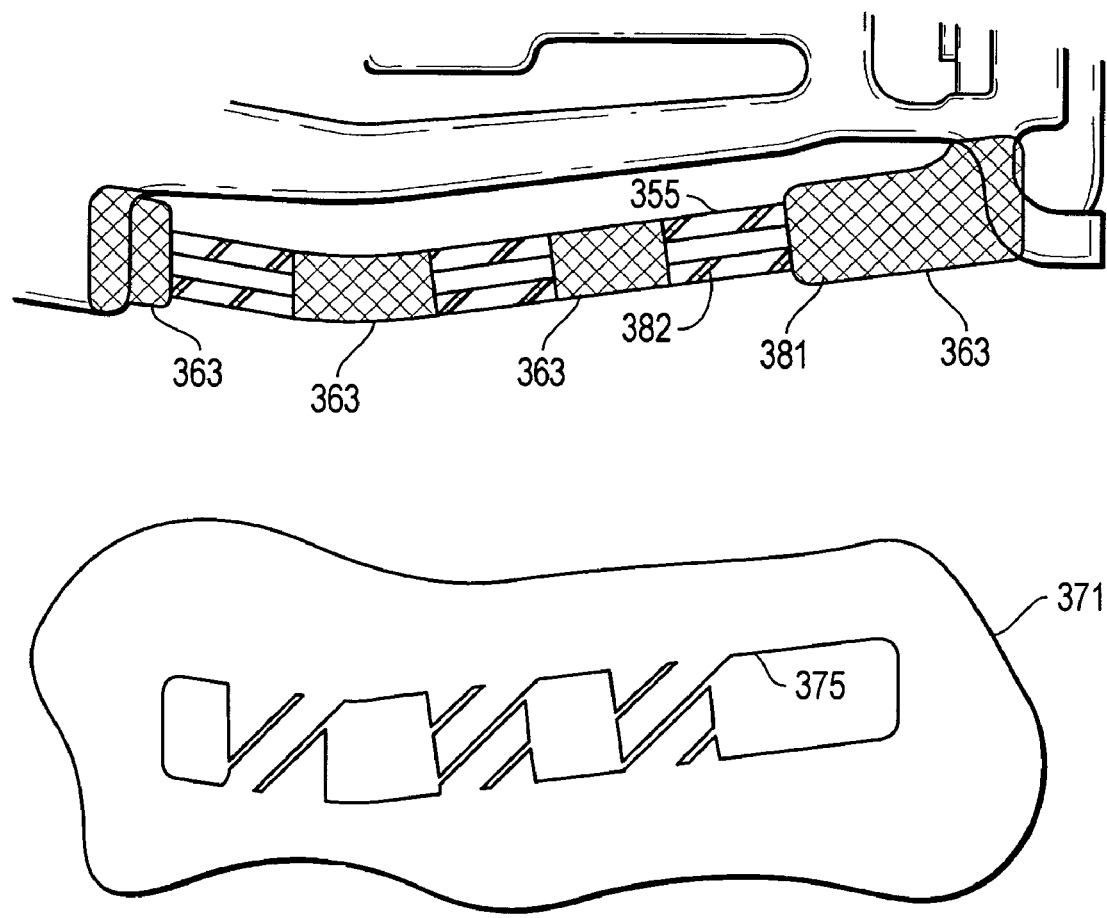
FIG. 13 is an enlarged top view of a yet another alternate embodiment of a freestanding portion having a varying conductive reference and a mask used to produce it and is constructed in accordance with the present invention.
Figure 14:
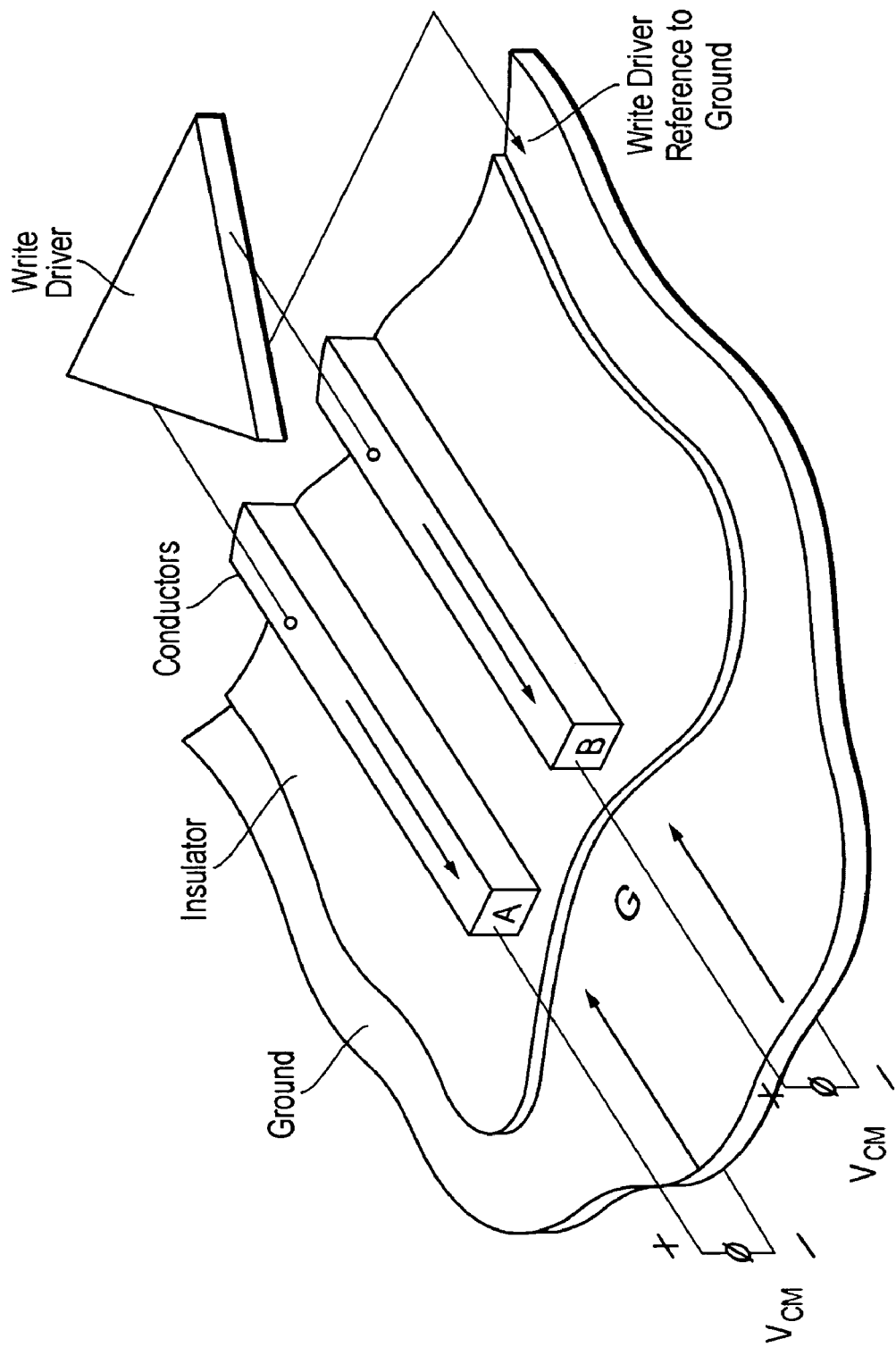
FIG. 14 is an isometric view of a transmission line model for a common mode signal component.
Figure 15:
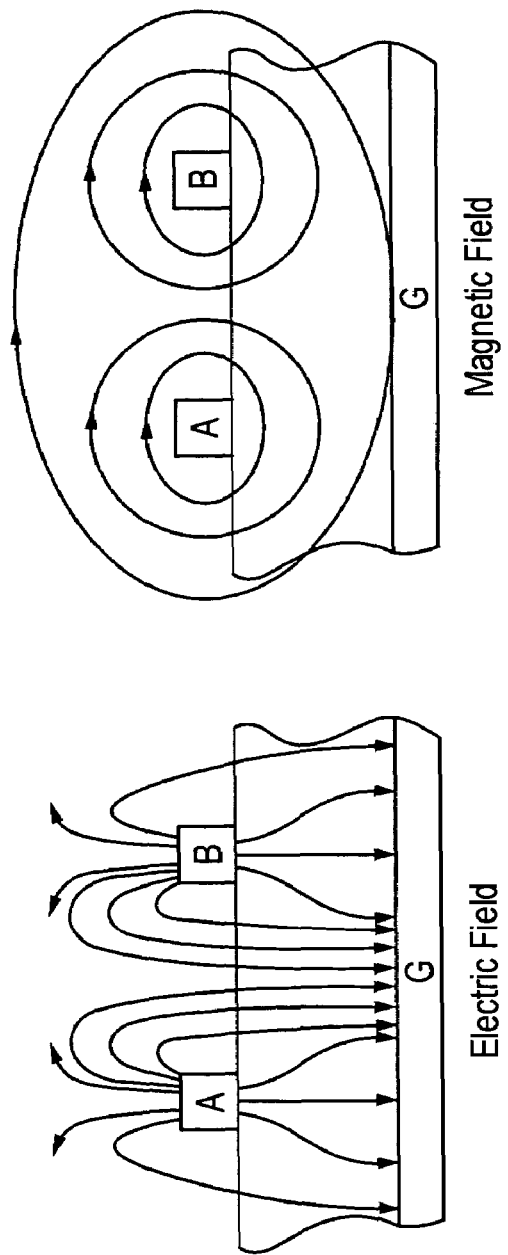
FIG. 15 illustrates sectional views depicting the electrical potential, magnetic field, and impedance of the model of FIG. 14.
Figure 15:
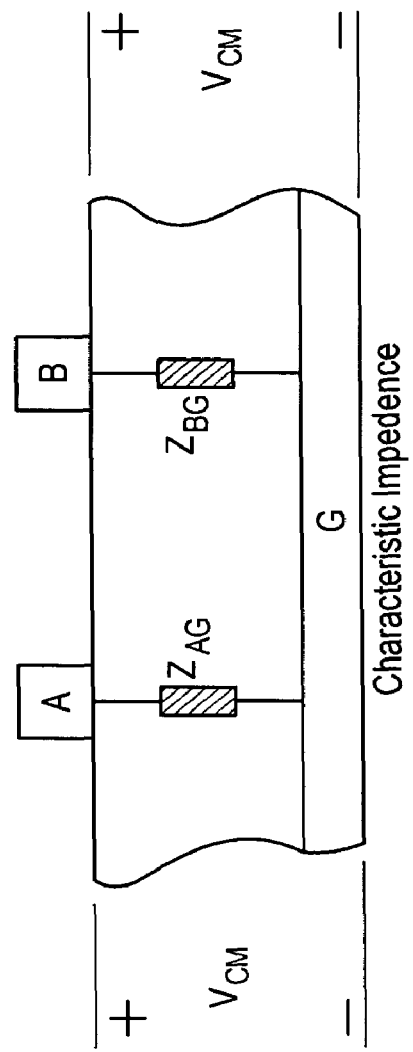
Figure 16:
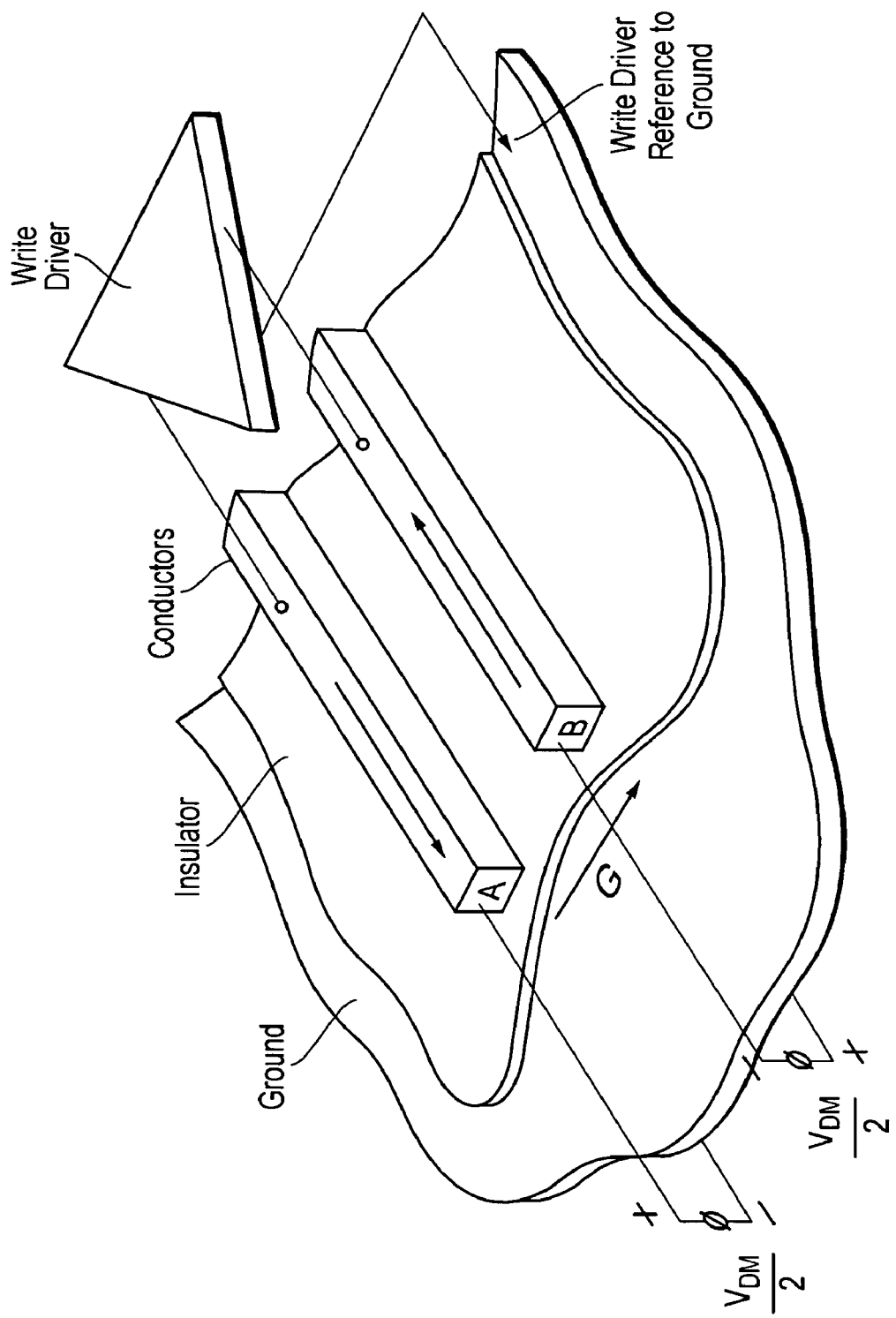
FIG. 16 is an isometric view of a transmission line model for a differential mode signal component.
Figure 17:
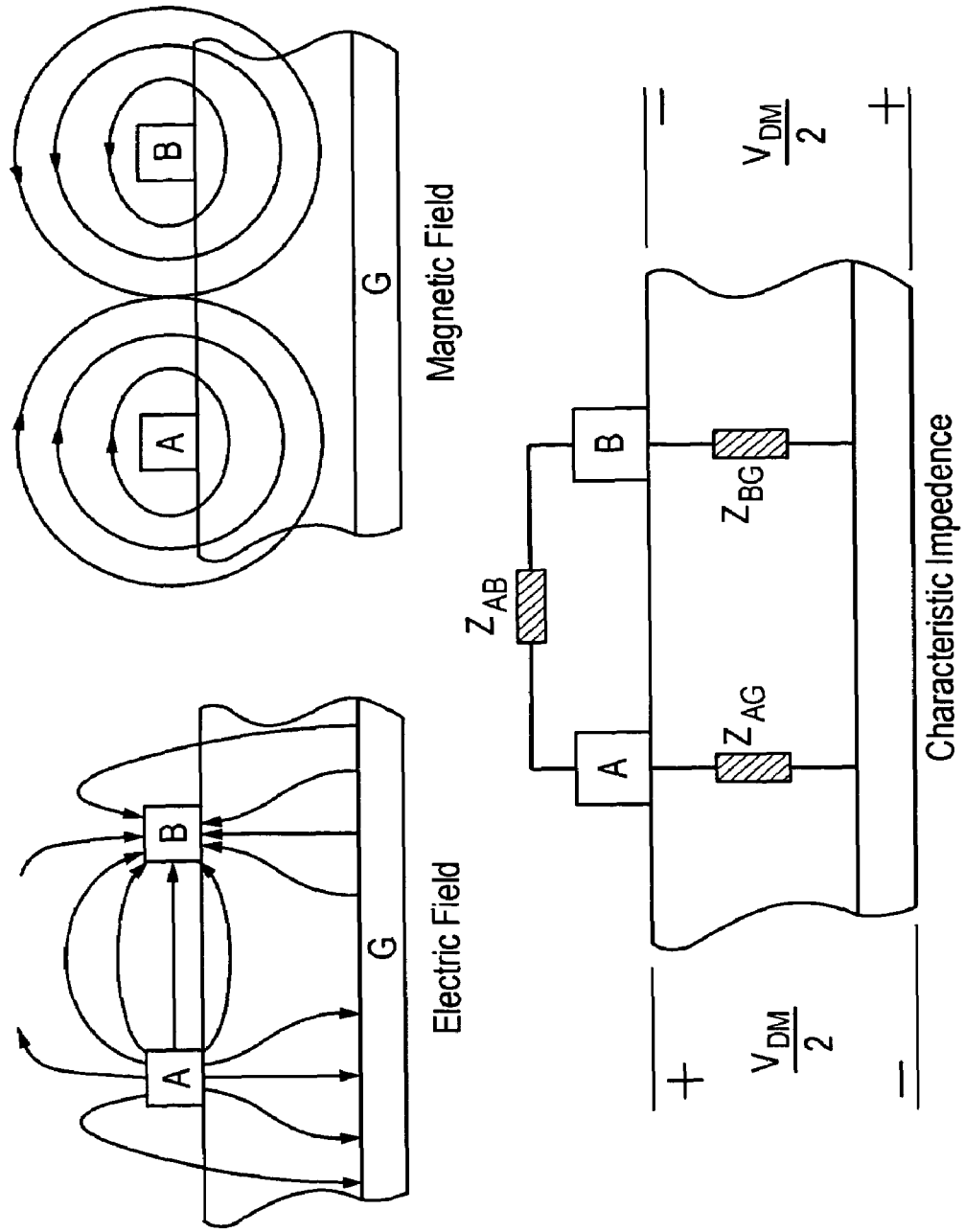
FIG. 17 illustrates sectional views depicting the electrical potential, magnetic field, and impedance of the model of FIG. 16.

In FIG. 12, the reference plane 281 is again configured by the shape of the screen pattern 275 of the screen 271, which varies several times in a lateral or transverse width as shown along the length of the freestanding portion 261, which extends in a longitudinal direction. In this version, the reference plane 281 is relatively narrow as it spans the conductors, but much wider at the insulators 263. In FIG. 13, the screen 371 has a pattern 375 that forms the reference plane 381 into wide segments at the insulators 363, and narrow, spaced apart, diagonal slits 382 as the reference plane 381 spans the conductors 355. The auxiliary reference plane extends in the longitudinal direction as it spans the freestanding portion and has elements that are diagonal with respect to the longitudinal direction. In addition, one embodiment of the freestanding portion may comprise the conductor and insulator with the base layer removed, no second insulator, and a conductive reference.

The present invention also comprises a method of fabricating a suspension. One embodiment of the method comprises providing a flexure 53 with a support layer 87, a conductor 55, and an insulator 63 between the support layer 87 and the conductor 55. The method also comprises removing a portion of the support layer 87 (see FIG. 9) around a portion of the conductor 55 to define a freestanding portion 61 of the conductor 55. A second insulator 85 and a conductive reference 83 is added to the freestanding portion 81 to provide additional referencing of the conductor 55.

The method may also comprise completing the foregoing steps prior to any forming or welding steps (see, e.g., FIGS. 5 and 6). In addition, the method may comprise forming the second insulator 85 and the conductive reference 83 with separate screens 71 (FIG. 8), and applying the second insulator 85 before the conductive reference 83. Furthermore, the method may comprise forming the second insulator 85 by one of a vacuum process and spray coating, and forming the conductive reference 83 by one of RF sputtering, evaporation, or plating.

The present invention has several advantages, including the ability to maintain a continuous reference plane in wireless suspensions. This solution is very inexpensive compared to prior art solutions and is easy to implement with minimal capital investment. It is readily applicable to any and all areas of freestanding copper in wireless suspensions.

While the invention has been shown or described in only some of its forms, it should be apparent to those skilled in the art that it is not so limited, but is susceptible to various changes without departing from the scope of the invention. For example, the conductive reference and insulators may be formed with photolithographic processes.

What is claimed is:

1. A suspension for a disk drive, comprising:
   a mount plate;
   a flexure mounted to the mount plate for providing structural support and a reference plane, the flexure extending in a longitudinal direction and defining a lateral direction that is perpendicular to the longitudinal direction, and a transverse direction that is perpendicular to both the longitudinal and lateral directions;
   at least one conductor extending from an area adjacent the mount plate to the flexure, the conductor being laterally spaced apart from at least a portion of the flexure to define a freestanding portion of the conductor that is outboard in the lateral direction;
   an insulator located between the flexure and the conductor to insulate the conductor from the flexure, such that the conductor and insulator are stacked in the transverse direction;
   an auxiliary reference plane formed on the freestanding portion of the conductor for improving transmission of the conductor, the auxiliary reference plane having a conductive reference for increasing signal coupling, the conductive reference being stacked on the freestanding portion of the conductor in the transverse direction; and
   an adhesion layer of Cr between the second insulator and the conductive reference at the freestanding portion, and a protective coating of Cr on the conductive reference to protect the conductive reference against corrosion, such that the protective coating, conductive reference, adhesion layer, second insulator, insulator, and conductor are stacked on each other in the transverse direction.

2. The suspension of claim 1, wherein the flexure utilizes steel, the insulator comprises polyimide, the conductor and the conductive reference comprise copper, and the auxiliary reference plane is only located adjacent to the freestanding portion.

3. The suspension of claim 1, wherein some of the base material of the flexure is removed therefrom to form a space between the freestanding portion of the conductor and said at least a portion of the flexure, and the conductive reference is longitudinally spaced apart from and does not make contact with the mount plate.

4. The suspension of claim 1, wherein the freestanding portion is in an area of a gimbal of the suspension, and the auxiliary reference plane is laterally spaced apart from said at least a portion of the flexure.

5. The suspension of claim 1, wherein the conductive reference is longitudinally spaced apart from and does not make contact with the flexure at at least one end of the freestanding portion and provides continuous conductivity by eddy currents between the conductive reference plane and the flexure.

6. The suspension of claim 1, wherein the conductive reference makes contact with the flexure and terminates at both ends of the freestanding portion.

7. The suspension of claim 1, further comprising a second insulator formed between at least some of the conductive reference and at least some of the flexure at the freestanding portion such that the conductive reference, second insulator, insulator, and conductor are stacked in the transverse direction and any disruptions in referencing the suspension are substantially eliminated.

8. The suspension of claim 7, wherein the second insulator overlaps at least some of the insulator and at least some of the flexure such that the conductive reference does not make contact with the flexure and provides auxiliary referencing of the conductor by eddy currents, and the second insulator comprises alumina or fluorocarbon film.

9. The suspension of claim 7, wherein the second insulator has a thickness of about 0.1 to 18 microns, the conductive reference has a thickness of about 1,000 to 1,500 angstroms.

10. The suspension of claim 1, wherein the conductive reference of the auxiliary reference plane has a width that varies several times in the lateral direction as it spans the freestanding portion in the longitudinal direction, and a transverse elevation in the transverse direction that varies as it spans the freestanding portion in the longitudinal direction.

11. The suspension of claim 1, wherein the conductive reference of the auxiliary reference plane extends in the longitudinal direction as it spans the freestanding portion comprising wide segments at the insulators and narrow, spaced apart, diagonal slits as the conductive reference spans the conductors.

12. A disk drive, comprising:
    a housing having a media disk rotatably mounted thereto and an actuator movably mounted thereto for moving a transducer relative to the disk, the transducer reading data from and writing data to the media disk; the actuator further comprising:
    an arm having a mount plate;
    a flexure mounted to the mount plate for providing structural support and a reference plane and extending in a longitudinal direction and defining a lateral direction that is perpendicular to the longitudinal direction, and a transverse direction that is perpendicular to both the longitudinal and lateral directions;
    at least one conductor extending from an area adjacent the mount plate to the flexure, the conductor being spaced apart from at least a portion of the flexure to define a freestanding portion of the conductor that is outboard of the transducer in the lateral direction;
    an insulator located between the flexure and the conductor to insulate the conductor from the flexure;
    an auxiliary reference plane formed on and located only adjacent to the freestanding portion of the conductor for improving transmission of the conductor, the auxiliary reference plane having a conductive reference for further referencing the conductor that is longitudinally spaced apart from and does not make contact with the mount plate, and a second insulator formed between at least some of the conductive reference and at least some of the flexure such that the conductive reference, second insulator, insulator, and conductor are stacked in the transverse direction and any disruptions in referencing the suspension are substantially eliminated; and wherein
    the conductive reference of the auxiliary reference plane has a width that varies several times in the lateral direction as it spans the freestanding portion in the longitudinal direction, and a transverse elevation in the transverse direction that varies as it spans the freestanding portion in the longitudinal direction.

13. The disk drive of claim 12, wherein the second insulator overlaps at least some of the insulator and at least some of the flexure in the transverse direction such that the conductive reference does not make contact with the flexure and provides auxiliary referencing of the conductor by eddy currents.

14. The disk drive of claim 12, wherein the conductive reference is longitudinally spaced apart from and does not make contact with the flexure at at least one end of the freestanding portion and provides auxiliary referencing of the conductor by eddy currents.

15. The disk drive of claim 12, wherein the conductive reference makes contact with the flexure and terminates at both ends of the freestanding portion.

16. The disk drive of claim 12, wherein the second insulator has a thickness of about 0.1 to 18 microns, the conductive reference has a thickness of about 1,000 to 1,500 angstroms.

17. The disk drive of claim 16, further comprising an adhesion layer of Cr between the second insulator and the conductive reference, and a protective coating of Cr on the conductive reference to protect the conductive reference against corrosion, such that the protective coating, conductive reference, adhesion layer, second insulator, insulator, and conductor are stacked on each other in the transverse direction.

18. The disk drive of claim 16, wherein the conductive reference of the auxiliary reference plane extends in the longitudinal direction as it spans the freestanding portion comprising wide segments at the insulators and narrow, spaced apart, diagonal slits as the conductive reference spans the conductors.

19. A disk drive, comprising:
a housing having a media disk rotatably mounted thereto and an actuator movably mounted thereto for moving a transducer relative to the disk, the transducer reading data from and writing data to the media disk; the actuator further comprising:
an arm having a mount plate;
a flexure mounted to the mount plate for providing structural support and a reference plane and extending in a longitudinal direction and defining a lateral direction that is perpendicular to the longitudinal direction, and transverse direction that is perpendicular to both the longitudinal and lateral directions;
at least one conductor extending from an area adjacent the mount plate to the flexure, the conductor being spaced apart from at least a portion of the flexure to define a freestanding portion of the conductor that is outboard of the transducer in a lateral direction;
an insulator located between the flexure and the conductor to insulate the conductor from the flexure;
an auxiliary reference plane formed on and located only adjacent to the freestanding portion of the conductor for improving transmission of the conductor, the auxiliary reference plane having a conductive reference for further referencing the conductor that is longitudinally spaced apart from and does not make contact with the mount plate, the conductive reference being stacked on the freestanding portion of the conductor in the transverse direction; and
a second insulator formed between at least some of the conductive reference and at least some of the flexure such that any disruptions in referencing the suspension are substantially eliminated, the second insulator overlapping at least some of the insulator and at least some of the flexure such that the conductive reference, second insulator, insulator, and conductor are stacked in the transverse direction, the conductive reference does not make contact with the flexure and provides auxiliary referencing of the conductor by eddy currents; and wherein
the conductive reference of the auxiliary reference plane has a width that varies several times in the lateral direction as it spans the freestanding portion in the longitudinal direction, and a transverse elevation in the transverse direction that varies as it spans the freestanding portion in the longitudinal direction.

20. The disk drive of claim 19, wherein the conductive reference is longitudinally spaced apart from and does not make contact with the flexure at at least one end of the freestanding portion and provides auxiliary referencing of the conductor by eddy currents.

21. The disk drive of claim 19, wherein the conductive reference makes contact with the flexure and terminates at both ends of the freestanding portion, and the conductive reference of the auxiliary reference plane extends in the longitudinal direction as it spans the freestanding portion comprising wide segments at the insulators and narrow, spaced apart, diagonal slits as the conductive reference spans the conductors.

* * * * *